United States Patent
Leising

(10) Patent No.: US 9,181,127 B2
(45) Date of Patent: Nov. 10, 2015

(54) AGENTS FOR INERTING CLAYS IN HYDRAULIC COMPOSITIONS

(75) Inventor: Frederic Leising, Avilly Saint Leonard (FR)

(73) Assignee: CHRYSO, Issy les Moulineaux (FR)

( * ) Notice: Subject to any disclaimer, the term of this patent is extended or adjusted under 35 U.S.C. 154(b) by 585 days.

(21) Appl. No.: 13/512,467

(22) PCT Filed: Nov. 30, 2010

(86) PCT No.: PCT/FR2010/052576
§ 371 (c)(1),
(2), (4) Date: Dec. 7, 2012

(87) PCT Pub. No.: WO2011/064518
PCT Pub. Date: Jun. 3, 2011

(65) Prior Publication Data
US 2013/0074740 A1      Mar. 28, 2013

(30) Foreign Application Priority Data
Nov. 30, 2009   (FR) ...................................... 09 58511

(51) Int. Cl.
| | |
|---|---|
| C04B 24/00 | (2006.01) |
| C04B 24/04 | (2006.01) |
| C04B 20/10 | (2006.01) |
| C04B 28/02 | (2006.01) |
| C04B 111/27 | (2006.01) |

(52) U.S. Cl.
CPC ............ *C04B 24/008* (2013.01); *C04B 20/1022* (2013.01); *C04B 24/04* (2013.01); *C04B 28/02* (2013.01); *C04B 2111/27* (2013.01)

(58) Field of Classification Search
CPC ........ C04B 24/00; C04B 24/04; C04B 24/008
USPC .................................................. 106/728, 803
See application file for complete search history.

(56) References Cited

U.S. PATENT DOCUMENTS

| | | | |
|---|---|---|---|
| 2,982,665 A | 5/1961 | Wilcox | |
| 2,999,080 A | 9/1961 | Wilcox | |
| 3,290,164 A | 12/1966 | Ferrigno | |
| 3,300,326 A | 1/1967 | Ferrigno | |
| 3,628,738 A | 12/1971 | Mitchell et al. | |
| 8,257,490 B2 * | 9/2012 | Alain et al. ................... | 106/802 |
| 8,425,680 B2 * | 4/2013 | Jacquet et al. ............... | 106/802 |
| 8,834,626 B2 * | 9/2014 | Jacquet et al. ............... | 106/802 |
| 8,974,595 B2 * | 3/2015 | Guyot et al. .................. | 106/724 |

FOREIGN PATENT DOCUMENTS

| | | |
|---|---|---|
| WO | 2006032785 | 3/2006 |
| WO | 2006032786 | 3/2006 |

OTHER PUBLICATIONS

Answer 15 of 66 HCAPLUS: CN 102060468 (Guo et al.) May 18, 2011 Abstract Only.*
International search report dated Feb. 9, 2011 in corresponding PCT/FR2010/052576.

* cited by examiner

*Primary Examiner* — Paul Marcantoni
(74) *Attorney, Agent, or Firm* — Young & Thompson

(57) ABSTRACT

A method for inerting clays in a hydraulic composition includes one step of putting a hydraulic composition or a constituent of a hydraulic composition in contact with a compound of the formula (I) $R-COO^{31}$, $(M^{n+})_{1/n}$, wherein a method for making hydraulic composition, a pretreated granulate which may be obtained by mixing a granulate with the compound of formula (I), and an additive for inerting clays including a superplasticizer and the compound of formula (I) are described.

21 Claims, No Drawings

AGENTS FOR INERTING CLAYS IN HYDRAULIC COMPOSITIONS

The invention relates to agents for inerting clays present in hydraulic compositions.

Hydraulic compositions are compositions comprising a hydraulic binder. A hydraulic binder is a binder which is formed and hardened by chemical reaction with water. As hydraulic binders, mention may be made of plaster, calcium sulfates, calcium aluminates, lime and cement compositions, which allow preparation of hydraulic compositions, notably mortars and concretes, notably prefabricated concretes and ready-to-use concretes. These concretes may notably be intended for the building industry, civil engineering structures and for prefabrication.

It is known how to add fluidifying agent or superplasticizers, notably superplasticizers, such as polyoxyalkylene polycarboxylates (PCP), to hydraulic binders such as cements, plasters, calcium sulfates or lime, in order to reduce the water content of hydraulic binder slurry. Consequently, hydraulic binder slurry after hardening, has a denser structure. This is expressed by a higher mechanical strength.

Incorporation of these admixtures into the hydraulic compositions have allowed considerable technical development; nevertheless there remain difficulties related to their use, i.e. their sensitivity to concrete composition variations and notably their sensitivity to variations in the quality of the sands and granulates.

Thus, the presence of adsorbing impurities such as clays (montmorillonite, illite, kaolinite, . . . ) in hydraulic compositions generate fluctuations of properties, in particular considerable fluidity variations, due to a drop in the efficiency of these superplasticizers. This sensitivity is expressed by an increase in the required dose of admixture, which may cause losses of properties (compressive strength, cracking, durability . . . ). This overdosage further has to be determined by preliminary tests and is therefore a source of additional cost.

By the term of "clays" are designated aluminum and/or magnesium silicates either hydrated or not, notably phyllosilicates with a structure of sheets typically spaced apart by about 7 to about 14 angstroms. This term however is also directed to clays of other types, notably fibrous and amorphous clays. Various types of clays exist which are different by their structure and the number of sheets which they include. Among the clays frequently encountered in sands and granulates, mention may notably be made of montmorillonite, illite, kaolinite, muscovite and chlorite.

The clays may be of the 2:1 type (montmorillonite) but also of the 1:1 type (kaolinite) or of the 2:1:1 type (chlorite). The most currently encountered clays in sands, granulates and lime fillers entering the composition of hydraulic compositions are kaolinite of formula $Si_2O_5Al_2(OH)_4$, montmorillonite of formula $Si_8O_{20}Al_4(OH)_4$ and illite of formula $KAl_2(AlSi_3O_{10})(OH)_2$.

These clays form a family of lamellar solids which have the remarkable property of adsorbing or inserting cationic or neutral molecules between their sheets.

Thus, montmorillonite has a charge deficiency which varies between 0.6 and 0.9 because of isomorphic substitutions both in the tetrahedral and/or octahedral layers. Electrical compensation is ensured by the insertion of more or less hydrated cations in the interfoliar space. One of the consequences is that it may receive water molecules in the interfoliar space and form what is called a swelling clay.

Illite which has the same crystalline structure differs by the type and number of substitutions. The space between the sheets is larger in montmorillonite than in illite where more voluminous $K^+$ ions are found very close to the substitution points and are firmly inserted between the sheets and therefore prevent swelling of this clay.

Kaolinite ore is formed by about 100 sheets which are difficult to dissociate. The cohesion forces present in kaolinites are mainly of the electrostatic type, completed by interaction forces of the Van der Waals type and hydrogen bonds between the hydroxyl groups of a layer and the oxygen atoms of the adjacent layer. The bond is strong enough to prevent any swelling phenomenon between the layers.

Only montmorillonite is therefore capable of easily giving insertion compounds with organic polymer molecules; this should be much more difficult with kaolinite and illite.

Depending on the nature of the clay and according to the pH of the medium, either adsorption or intercalation will therefore be observed on these clays, or both joint phenomena.

The admixtures, notably the superplasticizers, added to the organic compositions are adsorbed at the surface of the clays and/or are inserted between the sheets making up the clays. The superplasticizers trapped in the clays are then no longer capable of playing their role for improving the dispersion of aqueous suspensions of hydraulic binders.

Therefore it is necessary to inert the clays.

Thus, in order to avoid undesirable adsorption of superplasticizers of the polycarboxylate type (PCP) on clays and therefore a loss of efficiency, WO 98/58887 proposes before adding the superplasticizer in the sand-cement mixture, the introduction of a sacrificial molecule: polyethylene glycols, or further inorganic or organic cations, notably quaternary ammoniums, which may be inserted into the sheets of the clays. The described method consists of putting the dry sand in contact with the sacrificial molecule by spraying the product in an aqueous solution. However, it is necessary to add a content of polyethylene glycol or of cation relatively to the cement in order to again find almost the totality of the efficiency of the polymeric admixture.

Documents WO2006/032785 and WO2006/032786 respectively recommend the use of a cationic polymer which may be linear or branched or of a mixture comprising a cationic polymer and an anionic polymer. The described method consists of putting dry sand in contact with the cationic polymer or the cationic polymer/anionic polymer mixture by spraying the product in an aqueous solution. The suggested cationic polymers are obtained by condensation of epichlorhydrin with dimethylamine or further dicyandiamide with formaldehyde. However, increasingly restrictive legislations aim at limiting the use of formaldehyde.

Document EP1201617 recommends, in order to increase the durability of compositions of hydraulic binders loaded with non-heat treated clays, the use of alkaline silicates or soluble salts of divalent or trivalent metals such as calcium nitrate. However, the described agents do not yet give entire satisfaction.

Moreover, Zhang et al. (SOIL. SCI. Soc. Am. J. 54, 59-66, 1990) teaches that acetate anions are repelled by the anionic charges present on the montmorillonite clay.

One of the objects of the present invention is to provide a method for inerting clays of a hydraulic composition.

For this purpose, according to a first aspect, the object of the invention is a method for inerting clays in a hydraulic composition comprising a step consisting of putting a hydraulic composition or a constituent of a hydraulic composition in contact with a compound of the following formula (I):

$$R-COO^-, (M^{n+})_{1/n} \qquad (I)$$

wherein:

R represents a group selected from H, alkyl and phenyl, n represents an integer comprised between 1 and 5, preferably between 1 and 4, $M^{n+}$ represents a cation selected from:
- $H^+$,
- a divalent, trivalent or tetravalent metal cation, and
- a group $[HNR_1R_2R_3]^{n+}$, wherein $R_1$, $R_2$, and $R_3$ represent independently of each other, H or a linear, branched or cyclic, optionally aromatic, saturated or unsaturated hydrocarbon chain, optionally substituted with one or several substituents selected from a hydroxyl and a group $NR_4R_5$, wherein $R_4$ and $R_5$ represent independently H or an alkyl optionally substituted with a group $NR_6R_7$, wherein $R_6$ and $R_7$ represent independently H or an alkyl, it being understood that the groups $R_1$, $R_2$, and $R_3$ may be bound together and form a ring with the nitrogen atom bearing them.

In the sense of the present application, an alkyl is a linear or branched, optionally cyclic saturated hydrocarbon aliphatic group, comprising from 1 to 8 carbon atoms, preferably from 1 to 4 carbon atoms, as examples, mention may be made of methyl, ethyl, propyl, isopropyl, butyl, isobutyl and tertiobutyl groups.

The hydrocarbon chain preferentially comprises from 1 to 8 carbon atoms, notably from 1 to 6 carbon atoms, preferably from 1 to 4 carbon atoms.

The agent inerting clays of formula (I) applied in the inerting method is a salt consisting of an anion $R—COO^-$ and of a cation $M^{n+}$, n representing the charge of the cation.

The compounds of formula (I) are actually useful for inerting clays of hydraulic compositions, i.e. for inhibiting swelling of the clays, and/or inhibiting adsorption on the clays or between the sheets of the clays of admixtures used in hydraulic compositions, notably superplasticizers. Thus, the compounds of formula (I) give the possibility of reducing, or even suppressing the loss of fluidity of the hydraulic compositions due to the clays. Generally, the compounds according to the invention give the possibility of suppressing the loss of fluidity of mortars and concretes based on cement binders over a period of 60 mins, notably 90 mins, preferably 120 mins.

The compounds of formula (I) applied in the inerting method also have the following advantages:
- they allow reduction in the amount of water or of fluidifying agent required for obtaining a desired fluidity for the hydraulic composition,
- they are efficient with different clays, in particular, the compounds of formula (I) are performing inerting agents for clays of type 2:1 (montmorillonite) but also of type 1:1 (kaolinite) or 2:1:1 (chlorite).
- they do not perturb the mechanical strengths of the hydraulic composition neither in a short term nor in a long term, even in the case of overdosage,
- they do not have any delaying effect on setting,
- they are stable over time and withstand heat and frost.

The compounds of formula (I) applied in the inerting method include an anion of formula $R—COO^-$. Typically, R represents H or an alkyl including from 1 to 4 carbon atoms. In a preferred embodiment, R represents H or a methyl. The anion is then the formate anion or the acetate anion. The compounds comprising these anions are actually either commercial compounds, or easy to prepare from formic acid or acetic acid. They are inexpensive and are particularly efficient as inerting agents.

The compounds of formula (I) applied in the inerting method also include a cation. The cation may be a proton. In this case, the compound is a carboxylic acid of formula RCOOH. The formic or acetic acids are preferred compounds.

The cation may also be a divalent, trivalent or tetravalent metal cation. The compounds comprising monovalent cations are actually less performing. Preferably, the metal cations are bivalent or trivalent. Indeed, generally the salts including bivalent or trivalent metal cations are less expensive than salts including tetravalent metal cations. Divalent metal cations are typically earth alkaline metal cations, notably selected from magnesium, calcium and barium ions. Aluminium is an example of a trivalent metal cation.

The cation may also be a group $[HNR_1R_2R_3]^{n+}$ wherein n, $R_1$, $R_2$, and $R_3$ are as defined above.

In an embodiment, $R_1$, $R_2$, and $R_3$ represent H and the cation of the compound of formula (I) is the ammonium cation $^+NH_4$. In another embodiment, $R_1$ and $R_2$ represent H and $R_3$ is different from H. The cation is then a primary ammonium. $R_3$ may for example be a phenyl, the cation then being the anilinium ion. $R_3$ may also represent a linear or branched alkyl, the cation then being for example monoethylammonium or monoisopropylammonium. In another embodiment, $R_3$ represents H and $R_1$ and $R_2$ are different from H. The cation is then a secondary ammonium. $R_1$ and $R_2$ may notably be alkyl groups. The cations may for example be diethyl ammonium or diisopropylammonium. In another embodiment, $R_1$, $R_2$, and $R_3$ are different from H. The cation is then a tertiary ammonium. Triethylammonium or ethyldiisopropylammonium are examples of suitable tertiary ammonium.

In an embodiment, at least two of the groups $R_1$, $R_2$, and $R_3$ are hydrocarbon chains bound together and at least two of the groups $R_1$, $R_2$, and $R_3$ form a ring with the nitrogen atom bearing them, which may be saturated, unsaturated or aromatic. Pyrrolidinium, piperidinium, pyridinium cations are examples of these cations. Two of the groups $R_1$, $R_2$, and $R_3$ may be grouped and bound to the nitrogen atom through an imine bond, like the pyridinium cation.

In an embodiment, in the formula (I) of the compound used as an inerting agent, at least one of the $R_1$, $R_2$, and $R_3$ represent a hydrocarbon chain substituted with a hydroxyl and/or with a group $—NR_4R_5$ as defined above. When the cation $[HNR_1R_2R_3]^{n+}$ includes one or several $—NR_4R_5$, groups, the nitrogen of the group $—NR_4R_5$ may be protonated ($—^+NHR_4R_5$) or non-protonated.

In an embodiment, the group $R_3$ is a group $—(CH_2)_q—NR_4R_5$ and the compound used as an inerting agent has the following formula (II):

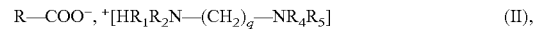

$$R—COO^-, {}^+[HR_1R_2N—(CH_2)_q—NR_4R_5] \qquad (II),$$

wherein R, $R_1$, $R_2$, $R_4$ and $R_5$ are as defined above and q represents an integer from 1 to 6, preferably from 1 to 4. When the group $—NR_4R_5$ of the compound formula (II) is protonated, the compound has the following formula (II'):

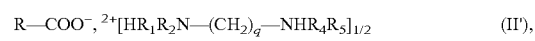

$$R—COO^-, {}^{2+}[HR_1R_2N—(CH_2)_q—NHR_4R_5]_{1/2} \qquad (II'),$$

Wherein R, $R_1$, $R_2$, $R_4$, $R_5$ and q are as defined above. Preferably, in the compounds of formula (II) or (II'), $R_1$, $R_2$, $R_4$ and $R_5$ represent independently H or alkyl groups, preferably H or methyl. The mono- or di-protonated forms of diethylaminopropylamine of tetramethylpropylene diamine are examples of suitable cations.

In another embodiment, at least one of the groups $R_4$ and $R_5$ represent an alkyl substituted with a group $NR_6R_7$, wherein $R_6$ and $R_7$ represent independently H or an alkyl, notably H or a methyl. In an embodiment, the group $R_3$ is a group $—(CH_2)_q—NR_4—(CH_2)_r—NR_6R_7$ ($R_5$ represents —$(CH_2)_r$—$NR_6R_7$) and the compound used as an inerting agent has the following formula (III):

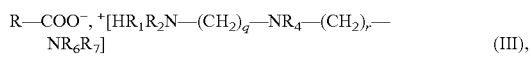
$$R—COO^-, \ ^+[HR_1R_2N—(CH_2)_q—NR_4—(CH_2)_r—NR_6R_7] \quad (III),$$

wherein R, $R_1$, $R_2$, $R_4$, $R_5$, $R_6$, $R_7$ and q are as defined above and r represents an integer from 1 to 6, preferably from 1 to 4 (independently of the value of q). The cation of the compound may also be in a diprotonated form (R—COO$^-$, $^{2+}$[HR$_1$R$_2$N—(CH$_2$)$_q$—HNR$_4$—(CH$_2$)$_r$—NR$_6$R$_7$]$_{1/2}$ or R—COO$^-$, $^{2+}$[HR$_1$R$_2$N—(CH$_2$)$_q$—HR$_4$—(CH$_2$)$_r$—HNR$_6$R$_7$]$_{1/2}$) or a triprotonated form (R—COO$^-$, $^{3+}$[HR$_1$R$_2$N—(CH$_2$)$_q$—HNR$_4$—(CH$_2$)$_r$—HNR$_6$R$_7$]$_{1/3}$). For example the mono-, di- or tri-protonated forms of dimethylaminopropyl-aminopropylamine may be used as a cation.

In another embodiment, at least one of the $R_1$, $R_2$, and $R_3$ represents a hydrocarbon chain substituted with a hydroxyl. Preferably, at least one of the $R_1$, $R_2$, and $R_3$ represent an alkyl substituted with a hydroxyl. The protonated forms of amino alcohols are actually particularly suitable cations. Thus, the protonated forms of monoethanolamine, diethanolamine, triethanolamine, s-butylethanolamine (marketed by ARKEMA® under the name of ALPAMINE® N41) and 2-dimethylamino-2-methyl-1-propanol (marketed by ANGUS Chemical® under the name of DMAMP®-80) are particularly suitable cations.

Generally, when a compound of formula (I) in which $M^{n+}$ represents $HNR_1R_2R_3$ is applied in the method, the pKa of the cation $[HNR_1R_2R_3]^{n+}$ is greater than 8, typically greater than 10, notably greater than 12. By pKa of the cation is meant the pKa of the acid/base pair $[HNR_1R_2R_3]^{n+}/[NR_1R_2R_3]^{(n-1)+}$. These pKa are actually suitable for maintaining the amine in the protonated form $[HNR_1R_2R_3]^{n+}$.

Advantageously, the inerting method applies compounds of formula (I) which are soluble in water. Typically, the compounds have a solubility in water of more than 5 g/L, or even more than 10 g/L. Compounds of formula (I) including less than 12 carbon atoms, notably less than 10 carbon atoms, in total (by taking into account the cation and the anion) are more preferred.

The compounds of formula (I) useful as agents for inerting clays may notably be prepared by:
reaction of carboxylic acids RCOOH with metal hydroxides (calcium hydroxide, magnesium hydroxide, barium hydroxide . . . ) for preparing metal carboxylates (calcium magnesium, barium carboxylate . . . ),
neutralization of carboxylic acids RCOOH with an amine $HNR_1R_2R_3$, for example ammonia, an aliphatic or aromatic amine, a diamine or a polyamine, or an aminoalcohol.

In an embodiment, the method for inerting clays in a hydraulic composition comprises the step consisting of putting one of the constituents of a hydraulic composition in contact with a compound of formula (I). A hydraulic binder, a granulate, a mineral addition, water, an admixture used during the preparation of the hydraulic composition (such as a superplasticizer, anti-air-drag additive or a fluidifying agent) are examples of constituents of a hydraulic composition.

Generally, the clay to be inerted stems from the granulate, notably from sand and/or filler. Sometimes, the hydraulic binder also includes clay. This is notably the case of CEM II/A-L, A-LL, B-L or B-LL cements with lime and cements with pozzolans such as CEM IV or V A or B.

A hydraulic binder is a binder which is formed and which hardens by chemical reaction with water. As hydraulic binders, mention may be made of plaster, calcium sulfate, lime and cement compositions.

By "granulates", is meant a set of mineral grains with an average diameter comprised between 0 and 125 mm. Depending on their diameter, the granulates are classified into one of the following six families: fillers, wind-blown sands, sands, sand-gravel mixes, grits and ballast (XP P 18-545 standard). The most used granulates are the following:
fillers, which have a diameter of less than 2 mm and for which at least 85% of the granulates have a diameter of less than 1.25 mm and at least 70% of the granulates have a diameter of less than 0.063 mm,
sands with a diameter comprised between 0 and 4 mm (in the 13-242 standard, the diameter may range up to 6 mm),
sand-gravel mixes with a diameter of more than 6.3 mm,
grits with a diameter comprised between 2 mm and 63 mm.
The sands are therefore comprised in the definition of a granulate according to the invention.

The fillers may notably be of limestone or dolomitic origin.

By "mineral addition", is meant a finely divided mineral material used in concrete in order to improve certain properties or to give it particular properties. The NF EN 206-1 standard distinguishes two types of mineral additions: quasi-inert additions (of type I) and additions with a pozzolan nature or hydraulic latency (of type II).

The additions of type 1 are:
limestone fillers according to the EN 12620:2000 standard
pigments, compliant with EN 12878
limestone additions, compliant with the NF P 18-508 standard
siliceous additions compliant with the NF P 18-509 standard The additions of type II group:
flying ashes, compliant with the NF EN 450 standard
silica fumes, complaint with EN 13263-1

Superplasticizers are admixtures called—water reducing agents—which are used for reducing the amount of water required for mixing hydraulic compositions. The following superplasticizers may notably be used in the compositions according to the invention:
sulfone salts of polycondensates of naphthalene and of formaldehyde, commonly called polynaphthalene sulfonates or further superplasticizers based on naphthalene;
sulfone salts of polycondensates of melamine and of formaldehyde, commonly called melamine-based superplasticizers;
lignosulfonates;
polyacrylates;
products based on polycarboxylic acids, notably polycarboxylate comb copolymers which are branched polymers for which the main chain bears carboxylic groups and for which the side chains consist of sequences of the polyether type, in particular polyethylene oxide, such as for example poly [(meth)acrylic acid-grafted-polyethylene oxide]. The superplasticizers of the ranges CHRYSO®Fluid Optima, CHRYSO®Fluid Premia and CHRYSO®Plast Omega marketed by Chryso, may notably be used.

According to a second aspect, the object of the invention is a hydraulic composition comprising a hydraulic binder, at least one granulate, water and a superplasticizer and further comprising a compound of formula (I) as defined above. The hydraulic composition may comprise more than one granulate, for example sand and a filler. In an embodiment, the hydraulic composition comprises a filler, notably a limestone filler. In an embodiment, the hydraulic composition further comprises at least one mineral addition and/or admixtures, for example an anti-air-drag additive or an anti-foaming agent.

Generally, the hydraulic composition comprises from 0.005 to 2% by weight, notably from 0.01% to 2% by weight, preferably from 0.05 to 1.5% by weight of a compound of formula (I).

The aforementioned hydraulic compositions may notably be concrete or mortar.

According to a third aspect, the object of the invention is a method for preparing the aforementioned hydraulic composition, comprising the step consisting of mixing a hydraulic composition or a constituent of a hydraulic composition with a compound of formula (I).

The inerting agent of formula (I) may actually be mixed with a hydraulic composition or else with one of its constituents before being put into contact with the other constituents in order to form the hydraulic composition.

In the aforementioned inerting method and in the aforementioned method for preparing a hydraulic composition, it is of course possible to put a precursor of a compound of formula (I) in contact with the composition or one of its constituents. A precursor is a chemical compound which, put into contact with the other constituents of the composition, leads to the formation of a compound of formula (I). These precursors may notably be:

a carboxylic acid of formula RCOOH and a metal hydroxide including a divalent, trivalent or tetravalent metal cation, which, when they are put into contact, form a compound of formula R—COO$^-$, $(M^{n+})_{1/n}$ wherein $M^{n+}$ represents a divalent, trivalent or tetravalent metal cation, the carboxylic acid RCOOH and an amine $HNR_1R_2R_3$ (wherein $R_1$, $R_2$, and $R_3$ are as defined above), which, when they are put into contact, form a compound of formula R—COO$^-$, $(M^{n+})_{1/n}$ wherein $M^{n+}$ represents a group $[HNR_1R_2R_3]^{n+}$.

However, generally, a compound of formula (I) gives the possibility of better maintaining fluidity of the hydraulic compositions than its precursors. It is generally preferable to use a compound of formula (I) as an inerting agent than two distinct salts, one comprising the anion R—COO$^-$ and the other one the cation $M^{n+}$.

Mixing of a hydraulic composition or one of its constituents with a compound of formula (I) or with its precursors may be carried out in a quarry, a concrete producing unit, or during the preparation of dry mortar.

According to an embodiment, the compound of formula (I) (or a precursor) is mixed with water prior to the introduction of this water into the hydraulic composition. Thus, the invention relates to a method for preparing an aforementioned hydraulic composition, comprising the steps:

mixing a compound of formula (I) with water, and then mixing the obtained mixture with a hydraulic binder, at least one granulate, and optionally a superplasticizer.

Generally, the water applied during mixing is mixing water, i.e. the water incorporated to the mixture of hydraulic binder and of granulates in order to cause its setting and giving the concrete its plasticity, therefore its workability. The quality of the mixing water should meet the EN 206-1 standard.

According to another embodiment, the compound of formula (I) (or a precursor) is mixed with a superplasticizer before introducing this water into the hydraulic composition. Thus, the invention also relates to a method for preparing the aforementioned hydraulic composition, comprising the steps:

mixing a compound of formula (I) with a superplasticizer, and then mixing the obtained mixture with at least one granulate, one hydraulic binder and water.

According to another embodiment, the compound of formula (I) (or a precursor of a compound of formula (I)) is mixed with a hydraulic binder, before introducing this hydraulic binder into the hydraulic composition. Thus, the invention also relates to a method for preparing an aforementioned hydraulic composition, comprising the steps:

mixing a compound of formula (I) with a hydraulic binder, and then mixing the obtained mixture with at least one granulate, water and optionally a superplasticizer.

The hydraulic binder is preferably cement. The step for mixing the compound of formula (I) with cement may notably be carried out during grinding of the cement.

According to another embodiment, the compound of formula (I) (or a precursor of a compound of formula (I)) is mixed with a granulate, notably in a quarry, before introducing this granulate into the hydraulic composition. Thus, the invention also relates to a method for preparing the aforementioned hydraulic composition, comprising the steps:

mixing a compound of formula (I) with at least one granulate, and then mixing the obtained mixture with a hydraulic binder, water, and optionally a superplasticizer.

The first step gives the possibility of inerting the clays present in the granulate before its introduction into the hydraulic composition, and of thereby obtaining a pre-treated granulate, i.e. for which the clay is inerted. Advantageously, the clay contained in the pretreated granulate is inerted by the compound of formula (I) before adding the granulate to the other constituents of the hydraulic composition. The pretreated granulate may notably be pretreated sand or pretreated filler, notably a pretreated limestone filler.

According to a fourth aspect, the object of the invention is a pretreated granulate which may be obtained by mixing a granulate with a compound of formula (I) as defined above. The pretreated granulate may notably be pretreated sand or pretreated filler, notably a pretreated limestone filler or a pretreated dolomitic filler.

This pretreated granulate is useful for preparing a hydraulic composition as defined above. The mixing may be carried out either by mixing a granulate with a compound of formula (I) in the form of a powder, or by spraying a solution, generally a hydroalcoholic or aqueous solution, preferentially an aqueous solution, of a compound of formula (I) onto the granulate, preferably a dry granulate (with an optional drying step after spraying).

According to a fifth aspect, the object of the invention is an additive for inerting clay comprising a superplasticizer and a compound of formula (I) as defined above.

The preferred additive for inerting clay comprises a compound of formula (I) as defined above and a polyoxyalkylene polycarboxylate (PCP) superplasticizer.

According to a sixth aspect, the object of the invention is the use of compound of formula (I) as defined above or of one of its precursors for inerting clays of hydraulic compositions.

According to a seventh aspect, the object of the invention is the use of a pretreated granulate as defined above, notably of a pretreated sand or a pretreated filler for inerting clays of hydraulic compositions.

According to an eighth aspect, the object of the invention is the use of an additive for inerting clay as defined above for inerting clays of hydraulic compositions.

EXAMPLES

In order to evaluate the performance of the compounds as agents inerting clays, the workability of mortar or concrete compositions made with granulates or naturally clayey fillers or added with 1% of montmorillonite and additived with an inerting agent, was evaluated by measuring the slump flow diameter. The methylene blue values of the granulates and fillers mentioned in the Examples are representative of the amounts of clays which they contain. The clay-inerting agents were evaluated as:

Sand pretreatment agent: the agent is introduced with the water for pre-wetting, A clay neutralizing additive: the agent is introduced with mixing water.

The clay-inerting agents were evaluated on standard formulations of self-compacting concrete and of equivalent concrete mortar.

All the experiments for which the results are indicated in a same table were conducted with the same proportion of superplasticizer, unless indicated otherwise.

By "pre-wetting water", is meant a portion of the total water which is used for humidifying the granulates before the mix, allowing simulation of the hygrometric condition of the granulates, often humid, in a concrete factory or on the site.

Example 1

Effect of the Addition of an Inerting Agent in Hydraulic Compositions

Composition of the Evaluation Formulations

Mortar formulation: All the inerting agents were evaluated in the mortar formulation below, in which sands without clays are totally or partly replaced with naturally clayey sands or clean sands added with clay. The different constituents of the mortar formula are expressed in g.

| | |
|---|---|
| CEM I 52.5 N LE HAVRE (cement) | 624.9 |
| Betocarb P2 ERBRAY (limestone filler) | 412.1 |
| FULCHIRON (windblown sand) | 587.7 |
| AFNOR standardized sand | 1,350 |
| Total water | 375.1 |

The cement CEMI 52.5N Le Havre was provided by Lafarge, the filler Erbray from Omya, the wind-blown sand Fulchiron by Fulchiron (with a methylene blue value of 0.5 g/kg) and sand standardized by the Société Nouvelle du Littoral (with a methylene blue value of less than 0.2 g/kg).

Superplasticizers CHRYSO®Fluid Optima 203, 224 or 300 (CHRYSO) were used with variable superplasticizer levels based on the weight of total binder (filler+cement=1,037 g) with which a target slump flow of 320 mm + or −20 mm may be attained.

The clay percentage (w/w) is expressed based on the total sand, i.e. AFNOR sand and FULCHIRON (windblown sand). Montmorillonite KSF used in the test is marketed by ALDRICH®.

Concrete formulation: The inerting agents were evaluated in the concrete formulation below, in which 0/4 Berniere sand was added with montmorillonite or partly substituted with different clayey sands.

The different constituents of the concrete formulation are expressed in kg/m$^3$

| | |
|---|---|
| Cement CEM I 52.5N CP2 SAINT PIERRE LA COUR (Lafarge) | 280 |
| Limestone filler Betocarb P2 ERBRAY (OMYA) | 160 |
| 0/4 sand from BERNIERES | 900 |
| 4/10 gravel from VILLERMAIN | 165 |
| 8/16 gravel from LOIRE | 663 |
| Total water | 200 |

Superplasticizers CHRYSO®Fluid Optima 203, 224 or 300 (CHRYSO) were used. The KSF montmorillonite used in the tests is marketed by ALDRICH.

Preparations of Formulations for Mortar and Concrete Tests

For mortar tests: The cement used is CEM I 52,5N CE CP2 NF® from the Le Havre factory (Lafarge), and the superplasticizer used is CHRYSO®Fluid Optima 224.

The reference mortar formulation is prepared according to the following kneading procedure:

sands (0/2 AFNOR®+0/1 Fulchiron®) (the mixture forming a clean sand) are dry mixed in a mixer of the type Perrier® at a low rate for 30 seconds before introducing the pre-wetting water and kneading is continued for a further 30 seconds, after having left the mixture (sand+water) at rest for 4 minutes, the cement and the filler are added and are then mixed for 1 minute at a low rate, next, the water for the mix is added within 30 seconds with the superplasticizer and they are mixed at a low rate for 90 seconds, the mixer is stopped in order to scrape the walls of the kneading bowl by means of a flexible scraper for 30 seconds. Finally, mixing is carried out at a high rate (298 rpm) for 1 minute.

Case of Natural Clayey Sands

The aforementioned kneading procedure was followed while replacing the clean sand with a clayey sand. The slump flow measurement at 5 minutes was conducted within the 30 seconds which followed the end of the kneading.

Case of Sands Added with Clay

The aforementioned kneading procedure was followed while replacing the clean sand with clayey sand, i.e. an initially clean sand which was contaminated with clay (montmorillonite). The mortar is prepared as indicated above, except that the amount of filler is reduced by the added clay content, in order to maintain a constant level of fines in the composition. The experiments were conducted with 1% of added clay, which corresponds to a usual percentage of clays in most sands.

The clayey sand is prepared by mixing a sand with a grain size from 0 to 2 mm stemming from a mixture of two clean sands: 0/1 Fulchiron® sand and 0/2 AFNOR® standardized sand having methylene blue values of 0.5 g/kg and less than 0.2 g/kg, respectively (test according to the NF-EN 933-9 standard), with 1% by weight of montmorillonite and the pre-wetting water at a low rate (142 rpm).

The slump flow measurement at 5 minutes was conducted within the 30 seconds following the end of the kneading.

For concrete tests: the evaluation of the agents for inerting the clays was carried out in a formulation of self-compacting concrete of the ready-to-use concrete type in which the clean sand was replaced with clayey sand or added with 1% by weight of KSF montmorillonite. The efficiency of the clay-inerting agents was examined comparatively with the formulation with clean sand not added with montmorillonite. The cement used is CEM I 52,5N CE CP2 NF from the factory of Saint Pierre La Cour (Lafarge). The superplasticizer CHRYSO® Fluid Optima 224 was diluted in water up to a concentration of 20%, its pH is established at a value between 5 and 6 by means of soda. An anti-air-drag additive is also added in order to eliminate any influence of trapped bubbles on the rheology of the slurry. The clay inerting agent was introduced into the mixture with the water for the mix. The reference concrete formulation is prepared according to the following kneading procedure:

- granulates (sands and gravel) are dry mixed in a mixer of the Raynen® type at a low rate for 30 seconds before introducing the pre-wetting water ($1/3^{rd}$ of the total amount of the total water) and continuing kneading for up to 1 minute,
- after having left the mixture of pre-humidified granulates at rest for 4 minutes, the cement and the filler are added and they are mixed for 1 minute at a low rate,
- next, the water for the mix is added within 30 seconds with the superplasticizer and mixing is performed at a low rate for 1 minute and 30 seconds.

Rheological Measurements.

The workability of the mortars was evaluated by measuring slump flow (measurement of the diameter of the mortar pool formed on a flat plate after casting). A test inspired from the PR NF EN 12350-8 standard is performed according to the following operating mode. The cone used is a reproduction to a scale of one half of the Abrams cone (see NF P 18-451 standard, 1981):

Diameter of the upper base circle: 50±0.5 mm
Diameter of the lower base circle: 100±0.5 mm
Height: 150±0.5 mm
The dimensions of the slump flow plate should be greater than or equal to 600×600 mm².

The mortar or the concrete is poured into the cone continuously and the excess of mortar at the surface of the cone is leveled. In order to carry out spreading, the cone is lifted perpendicularly to the plate while rotating by a quarter turn. By means of a flexible spatula, the mortar adhered to the inner walls of the cone is recovered while remaining close to the surface of the formed cake in order not to force slump flow of the cake. After having waited for the mortar or concrete to set into place and having attained its maximum spread, the average diameter (to within ±1 mm) of the cake is determined by carrying out 3 measurements (along axes forming an angle of 120 degrees between them). The workability of the concrete was evaluated according to the PR NF EN 12350-8 standard project. The tests were conducted at 20° C. The slump flow was measured at 5, 30, 60 and 90 minutes along 2 diameters at 90° from each other. In the experiments hereafter, $T_0$ corresponds to the instant when the cement is added to the humid granulates.

The closer the result of the rheological measurement is to the reference (concrete or mortar comprising a clay-free sand), the more performing is the inerting agent. The role of inerting agents is actually to obtain fluidity for hydraulic compositions comprising clays identical with that obtained for a clay-free composition.

Example 1a

Results with Mortar Tests with Clean Sand or Sand Added with Clay

The performances of different inerting agents according to the invention were tested. The superplasticizer CHRYSO®Fluid Optima 203 was used in the compositions of Example 1a (with a mass concentration identical for the tests for which the results are grouped in a same table).

Low molar mass carboxylic acids were examined: formic acid, and acetic acid (R represents H or Me and $M^{n+}$ represents H in formula (I) according to the invention). Table 1 provides the results of the rheological measurements. The percentages are expressed in % based on the total sand weight (w/w).

TABLE 1 results of rheological measurements with R = H or Me.

| Inerting agent | % of clay (montmorillonite) | % of inerting agent | Slump flow [mm] | | | | |
| --- | --- | --- | --- | --- | --- | --- | --- |
| | | | T 5 mins | T 30 mins | T 60 mins | T 90 mins | T 120 mins |
| reference | 0 | 0 | 320 | 395 | 400 | 395 | 390 |
| without inerting agent | 1 | 0 | 245 | no longer measurable | — | — | — |
| HCOOH | 1 | 0.1 | 340 | 340 | 320 | 300 | 270 |
| MeCOOH | 1 | 0.1 | 310 | 340 | 330 | 310 | 295 |

In the following experiments, the inerting agents have the formula (I) in which R represents a methyl (the anion is an acetate) and $M^{n+}$ represents H or a group $[HNR_1R_2R_3]^{n+}$.

The acetates of amino-alcohols were prepared by an equimolar mixture of acetic acid and of an amino-alcohol. Monoethanolamine is marketed by BASF®, diethylaminopropylamine (DEAPA), ethyldiisopropylamine (EDIPA), diisopropylamine (DIPA) and s-butyl monoethanolamine (ALPAMINE N41®) are marketed by ARKEMA®. The examined dimethylaminoethylpropanol is marketed by ANGUS Chemical®. These inerting agents were put into an aqueous solution (a 72% active material content (concentrations in g for 100 g of solution) for ammonium acetate, 81% for monethanolamine acetate, 86% for ethyldiisopropylamine acetate and 73% for diisopropylamine acetate). Tables 2 and 3 provide the results of rheological measurements. The percentages are expressed in % based on the total sand weight (w/w).

TABLE 2 results of rheological measurements with $M^{n+}$ = H or $[HNR_1R_2R_3]^{n+}$.

| Inerting agent | % of clay (montmorillonite) | % of inerting agent | Slump flow [mm] | | | | |
|---|---|---|---|---|---|---|---|
| | | | T 5 mins | T 30 mins | T 60 mins | T 90 mins | T 120 mins |
| reference | 0 | 0 | 320 | 395 | 400 | 395 | 390 |
| without inerting agent | 1 | 0 | 245 | — | — | — | — |
| MeCOOH | 1 | 0.2 | 345 | 360 | 330 | 335 | 315 |
| MeCOONH$_4$ | 1 | 0.2 | 345 | 380 | 370 | 355 | 330 |
| MeCOO[H$_3$N—(CH$_2$)$_2$—OH] | 1 | 0.2 | 370 | 400 | 390 | 375 | 360 |
| MeCOO[H$_2$N(s-Bu)—(CH$_2$)$_2$—OH] | 1 | 0.2 | 360 | 380 | 370 | 355 | 330 |

(s-Bu = s-butyl)

TABLE 3 results of rheological measurements with $M^{n+}$ = $[HNR_1R_2R_3]^{n+}$.

| Inerting agent | % of clay (montmorillonite) | % of inerting agent | Slump flow [mm] | | | | |
|---|---|---|---|---|---|---|---|
| | | | T 5 mins | T 30 mins | T 60 mins | T 90 mins | T 120 mins |
| reference | 0 | 0 | 335 | 395 | 385 | 375 | 370 |
| Without inerting agent | 1 | 0 | 280 | 300 | 300 | 290 | 275 |
| MeCOONH$_4$ | 1 | 0.2 | 360 | 380 | 360 | 350 | 330 |
| MeCOO[HEt$_2$N—(CH$_2$)$_3$—NH$_2$] | 1 | 0.2 | 370 | 380 | 360 | 360 | 335 |
| MeCOO[HNEt(i-Pr)$_2$] | 1 | 0.2 | 350 | 360 | 330 | 330 | 305 |
| MeCOO[HMe$_2$N—C(CH$_3$)$_2$—CH$_2$—OH] | 1 | 0.2 | 340 | 360 | 340 | 330 | 320 |

Experiments were also conducted by using divalent metal cations (an earth alkaline metal ion). Calcium acetate and magnesium acetate are products (powders) marketed by KEMIRA® (NL) and distributed in France by IMCD®. These inerting agents were put into an aqueous solution, at mass concentrations of 20% for calcium acetate, 25% for magnesium acetate. Table 4 provides the results of the rheological measurements. The percentages are expressed in % based on the total sand weight (w/w).

TABLE 4 results of rheological measurements with $M^{n+}$ = H or metal cation.

| Inerting agent | % of clay (montmorillonite) | % of inerting agent | Slump flow [mm] | | | | |
|---|---|---|---|---|---|---|---|
| | | | T 5 min | T 30 mins | T 60 mins | T 90 mins | T 120 mins |
| reference | 0 | 0 | 320 | 495 | 400 | 395 | 390 |
| without inerting agent | 1 | 0 | 245 | no longer measurable | — | — | — |
| MeCOOH | 1 | 0.2 | 345 | 360 | 335 | 315 | 300 |
| MeCOO(Ca)$_{1/2}$ | 1 | 0.2 | 335 | 380 | 370 | 350 | 330 |
| MeCOO(Mg)$_{1/2}$ | 1 | 0.2 | 360 | 370 | 370 | 355 | 335 |

The results of Tables 1-4 show that the compounds of formula (I) are performing agents for inerting clays.

The performances of the inerting agent $(MeCOO^-)_2Mg^{2+}$ were also compared with those obtained when $MgCl_2$ on the one hand (comprises $Mg^{2+}$ ions) and acetic acid MeCOOH on the other hand are used separately (mortar type tests). Table 5 provides the results of the rheological measurements. The percentages are expressed in % based on the total sand weight (w/w).

TABLE 5 results of the rheological measurement.

| Inerting agent | % of clay (montmorillonite) | % of inerting agent | Slump flow [mm] | | | | |
|---|---|---|---|---|---|---|---|
| | | | T 5 mins | T 30 mins | T 60 mins | T 90 mins | T 120 mins |
| reference | 0 | 0 | 320 | 395 | 400 | 395 | 390 |
| without inerting agent | 1 | 0 | 245 | no longer measurable | — | — | — |
| $MgCl_2$ | 1 | 0.1 | 345 | 330 | 320 | 300 | 270 |
| MeCOOH | 1 | 0.1 | 310 | 340 | 330 | 310 | 295 |
| $MeCOO(Mg)_{1/2}$ | 1 | 0.1 | 340 | 355 | 345 | 325 | 305 |

The carboxylate anion-metal cation combination is more performing in terms of maintaining fluidity of the prepared hydraulic compositions in the presence of sand added with clay than the constituents of these mixtures (carboxylic acid and metal salt) taken separately. This optimum performance seems to result from a synergistic effect between the carboxylate anion and the metal cation.

Example 1b

Results with Mortar Tests with Sand Naturally Comprising Clays

The RHEU sand (LAFARGE) is particularly rich in clays (methylene blue value of 4.2 g/kg). It is difficult to use it as a single sand and to obtain a hydraulic composition having satisfactory fluidity. Consequently it is often used in a mixture with other sands. In the following experiments, the designation "RHEU sand" in fact means a mixture of 30% of RHEU sand and 70% of FULCHIRON sand. The percentages are expressed in % based on the total sand weight (w/w). The superplasticizer CHRYSO®Fluid Optima 203 was used in the compositions of Example 1b (with a mass concentration which is identical in the different tests).

TABLE 6 results of rheological measurements.

| Inerting agent | % of inerting agent | Slump flow [mm] | | | | |
|---|---|---|---|---|---|---|
| | | T 5 min | T 30 min | T 60 min | T 90 min | T 120 min |
| Reference without RHEU sand | 0 | 320 | 395 | 400 | 395 | 390 |
| Reference with RHEU sand | 0 | 230 | 280 | 265 | 250 | 225 |
| MeCOOH | 0.1 | 240 | 305 | 285 | 265 | 240 |
| | 0.2 | 210 | 325 | 295 | 285 | 260 |
| | 0.3 | 285 | 315 | 300 | 275 | 250 |
| $MeCOO(Ca)_{1/2}$ | 0.3 | 200 | 310 | 295 | 275 | 240 |
| | 0.2 | 220 | 320 | 295 | 275 | 250 |
| | 0.05 | 235 | 295 | 275 | 260 | 230 |
| $MeCOONH_4$ | 0.2 | 260 | 355 | 340 | 320 | 295 |
| $MeCOO(Mg)_{1/2}$ | 0.2 | 290 | 355 | 345 | 320 | 305 |

These results show that the four studied agents for inerting clays allow partial compensation for the detrimental effect of the clays contained in the RHEU sand. Magnesium and ammonium acetates prove to be the most performing for inhibiting the clays of RHEU sand.

Example 1c

Results when Using Another Cement

In the reference mortar formulations below, the cement from Le HAVRE was substituted with the cement from SAINT-PIERRE LA COUR (LAFARGE). The percentages are expressed in % based on the total sand weight (w/w). The superplasticizer CHRYSO®Fluid Optima 206 was used in the compositions of Example 1c (with a mass concentration which is identical in the different tests).

TABLE 7 results of rheological measurements

| Inerting agent | % of inerting agent | Slump flow [mm] | | | | |
|---|---|---|---|---|---|---|
| | | T 5 min | T 30 min | T 60 min | T 90 min | T 120 min |
| Reference | 0 | 290 | 310 | 315 | 315 | 295 |
| Reference + 1% montmorillonite | 0 | 165 | 150 | — | — | — |

TABLE 7-continued results of rheological measurements

| Inerting agent | % of inerting agent | Slump flow [mm] | | | | |
|---|---|---|---|---|---|---|
| | | T 5 min | T 30 min | T 60 min | T 90 min | T 120 min |
| MeCOO(Ca)$_{1/2}$ | 0.5 | 260 | — | — | — | — |
| | 0.6 | 245 | 310 | 290 | 275 | 235 |
| MeCOOH | 0.5 | 260 | — | — | — | — |
| MeCOONH$_4$ | 0.2 | 220 | 190 | — | — | — |
| | 0.5 | 320 | 330 | 315 | 310 | 295 |
| MeCOO(Mg)$_{1/2}$ | 0.05 | 225 | 195 | — | — | — |
| | 0.2 | 330 | 300 | 290 | 285 | 270 |

With the inerting agents, calcium, ammonium and magnesium acetate, it is also possible to reduce the undesirable effect related to the presence of clays in mortar formulations based on cement from SAINT-PIERRE LA COUR.

The compounds are therefore considered to be robust towards composition variations of the cements.

Example 1d

Results with Concrete Tests

Calcium acetate and magnesium acetate are products (powders) marketed by KEMIRA® (NL) and distributed in France by IMCD®. Monoethanolamine acetate was prepared by an equimolar mixture of acetic acid and of monoethanolamine.

These inerting agents were put into an aqueous solution, at mass concentrations of 20% for calcium acetate, 25% for magnesium acetate and 81% for monoethanolamine acetate. They were used at levels of 0.2 and 0.4% by dry weight based on the weight of the sand.

The clean sand used is BERNIERE sand. In the following experiments, the designation "RHEU sand" in fact means a mixture of 30% of RHEU sand and 70% of BERNIERE sand.

The influence of the quality of the sand for inerting agents: calcium acetate (R represents a methyl) ($M^{n+}$ represents $Ca^{2+}$), magnesium acetate ($M^{n+}$ represents $Mg^{2+}$) or monoethanolamine acetate ($M^{n+}$ represents $^+H_3NCH_2CH_2OH$), was tested. Table 8 provides the result of the rheological measurements. The superplasticizer CHRYSO®Fluid Optima 224 was metered so as to have a slump flow of 700 mm + or −20 mm (with a mass concentration which is identical in the different tests).

TABLE 8 results of the rheological measurements.

| Sand | % of inerting agent | | | Slump flow [mm] | | |
|---|---|---|---|---|---|---|
| | (MeCOO)$_2$Ca | (MeCOO)$_2$Mg | MeCOO$^-$, $^+H_3NCH_2CH_2OH$ | T 5 min | T 30 min | T 60 min |
| Clean (control) | — | — | — | 690 | 670 | 675 |
| Clean | 0.2 | — | — | 730 | 775 | — |
| Clean + 1% montmorillonite (=sand added with clay) (control) | — | — | — | 570 | 525 | 530 |
| Clean + 1% montmorillonite | 0.2 | — | — | 695 | 690 | 670 |
| Lillion (control) | — | — | — | 550 | 530 | — |
| Lillion | 0.2 | — | — | 660 | 650 | 660 |
| Lillion | — | — | 0.2 | 680 | 660 | 655 |
| Lauzach (control) | — | — | — | 595 | 580 | — |
| Lauzach | 0.2 | — | — | 670 | 670 | 680 |
| RHEU sand (control) | — | — | — | 460 | 445 | — |
| RHEU sand | 0.2 | — | — | 565 | 515 | 485 |
| RHEU sand | 0.4 | — | — | 620 | — | — |
| RHEU sand | — | 0.2 | — | 595 | 555 | — |
| RHEU sand | — | 0.4 | — | 635 | 625 | |
| RHEU sand | — | — | 0.2 | 595 | 525 | 535 |
| RHEU sand | — | — | 0.4 | 635 | 535 | 495 |

Upon reading these results, it is concluded that:
   an inerting agent level comprised between 0.2 and 0.25% by dry weight based on the sand weight gives the possibility of neutralizing the detrimental effect of the clays contained in the studied sands,
   magnesium acetate appears to be slightly more efficient than calcium acetate.

Example 1e

Addition of a Clay-Inerting Agent in a Mortar Containing a Clayey Limestone Filler The mortar composition is identical with the one of Example 1. The operating methods for preparing the hydraulic compositions are similar to those of Example 1 while replacing the constituents with those of the two lists above and the superplasticizer with CHRYSO®Fluid Prémia 100 marketed by CHRYSO (with a mass concentration which is identical in the different tests).

The limestone filler is either the filler Void® provided by Carmeuse (clay-free, it is used as a reference), or a naturally clayey limestone filler (filler Les Aucrais® marketed by Carmeuse) for which the blue value is 2.66 g/kg.

The inerting agent used, i.e. magnesium acetate in a 25% by mass aqueous solution, was introduced with the pre-wetting water into the mixture of the sands and of the filler. The inerting agent was used at levels of 0.2 and 0.45 by dry weight based on the weight of the limestone filler. The rheological measurements were conducted by following the same procedure as the one described in Example 1.

Table 9 provides the results of the rheological measurements. In the following example, the inerting agent percentage is expressed in % by weight based on the limestone filler weight (w/w).

TABLE 9 results of the rheological measurements.

| Filler | % (MeCOO)$_2$Mg (/filler) | Slump flow (mm) T 5 min | T 30 min |
|---|---|---|---|
| Void ® | — | 320 | 255 |
| Aucrais ® | — | 220 | 170 |
| Aucrais ® | 0.2% | 270 | 200 |
| Aucrais ® | 0.4% | 280 | 210 |

The introduction of magnesium acetate at a level of 0.2% or 0.4% by weight relatively to the limestone filler has a substantial effect on the inerting of the clays contained in the limestone filler.

Example 1f

Adding an Agent for Inerting the Clays in a Concrete Containing a Clayey Limestone Filler and a Clayey Granulate The composition of the concrete is the following:

| Concrete composition | mix (30 kg) |
|---|---|
| CEM II/A S 42.5 N | 4.19 |
| FILLER TDKS (F) | 2.75 |
| 0/2 RHIN | 10.38 |
| 4/8 MOSELLE (G1) | 4.45 |
| 8/16 MOSELLE (G2) | 5.73 |
| TOTAL WATER | 2.38 |

The inerting agent used is monoethanolamine acetate. The superplasticizer used in the formulation is CHRYSO®Fluid Optima 203 marketed by CHRYSO (with a mass concentration which is identical in the different tests). Table 10 provides the results of the rheological elements. The percentages are expressed based on the total binder weight (filler and granulates G1 and G2).

TABLE 10 results of the rheological measurements

| % superplasticizer | % MeCOO[H$_3$N—(CH$_2$)$_2$—OH] | Slump flow (mm) | | | | |
|---|---|---|---|---|---|---|
| | | T 5 min | T 30 min | T 60 min | T 90 min | T 120 min (±10 min) |
| 1% | — | 640 | 625 | 565 | — | — |
| | 0.2% | 700 | 675 | 645 | — | — |
| 0.9% | — | 520 | 500 | 450 | 400 | 350 |
| | 0.2% | 655 | 615 | 535 | 495 | 435 |

The use of 0.2% of monoethanolamine acetate allows attenuation of the detrimental effect of the clays contained in the filler (methylene blue value of 2.66 k/kg) and in the fines of the granulates (methylene blue value from 3.3 to 5 g/kg) of the composition of the concrete (the spread passes from 520 mm to 655 mm).

Example 2

Determination of the Compressive Strengths of Hydraulic Compositions Comprising the Inerting Agents According to the Invention The concretes were prepared by following the procedures described in Example 1 by using the superplasticizer CHRYSO®Fluid Optima 224 (with a mass concentration which is identical in the different tests).

The early resistance was evaluated by measuring the compressive strength Rc of cubic specimens 15×15×15 cm$^3$ of concrete after 24 hours according to the EN 12390-3 standard. Table 11 provides the obtained results.

TABLE 11 results of the compressive strength measurements.

| | % Inerting agent/Sand (w/w) | | Compressive |
|---|---|---|---|
| Sand | (MeCOO)$_2$Ca | MeCOO$^-$, $^+$H$_3$NCH$_2$CH$_2$OH | strength (In MPa) |
| Clean (control) | — | — | 13.9 |
| Clean | 0.2 | — | 12.4 |
| Lillion (control) | — | — | 14.5 |
| Lillion | 0.2 | — | 13 |
| Lillion | — | 0.2 | 13.3 |
| Lozach (control) | — | — | 15.5 |
| Lozach | 0.2 | — | 12.1 |
| RHEU (control) | — | — | 14.8 |
| RHEU | 0.2 | — | 13.8 |
| RHEU | 0.4 | — | 12.7 |

These experiments show that the presence of inerting agents according to the invention does practically not affect the strength of the obtained concretes. The mechanical properties of the concrete are preserved.

The invention claimed is:

1. A method for inerting clays in a hydraulic composition, the method comprising putting the hydraulic composition or a constituent of the hydraulic composition in contact with a compound of formula (I):

$$R—COO^-, (M^{n+})_{1/n} \quad (I)$$

wherein:
R represents a group selected from the group consisting of H, an alkyl and a phenyl,
n represents an integer comprised between 1 and 5,
$M^{n+}$ represents a cation selected from the group consisting of:
$H^+$,
a divalent, trivalent or tetravalent metal cation, and
a group $[HNR_1R_2R_3]^{n+}$, wherein $R_1$, $R_2$, and $R_3$ represent independently of each other, H or a linear, branched or cyclic, saturated or unsaturated hydrocarbon chain, optionally aromatic, optionally substituted with one or more substituent selected from the group consisting of a hydroxyl and a group $NR_4R_5$, wherein $R_4$ and $R_5$ represent independently H or an alkyl optionally substituted with a group $NR_6R_7$, wherein $R_6$ and $R_7$ represent independently H or an alkyl,
or wherein the groups $R_1$, $R_2$, and $R_3$ are bound together to form a ring with the nitrogen atom bearing them.

2. The clay-inerting method according to claim 1, wherein R represents H or a methyl.

3. The clay-inerting method according to claim 1, wherein $M^{n+}$ represents $[HNR_1R_2R_3]^{n+}$ and at least one of $R_1$, $R_2$, and $R_3$ represents a hydrocarbon chain substituted with a hydroxyl and/or with the group $NR_4R_5$.

4. The clay-inerting method according to claim 1, wherein $M^{n+}$ represents $[HNR_1R_2R_3]^{n+}$ and the pKa of the cation $[HNR_1R_2R_3]^{n+}$ is greater than 8.

5. The clay-inerting method according to claim 1, wherein $M^{n+}$ represents an alkaline earth metal cation.

6. A hydraulic composition, comprising a hydraulic binder, at least one granulate, water, a superplasticizer, and the compound of formula (I) as defined in claim 1.

7. The hydraulic composition according to claim 6, comprising from 0.005% to 2% by weight of the compound of formula (I).

8. The hydraulic composition according to claim 6, wherein the hydraulic composition is a concrete or a mortar.

9. A method for preparing the hydraulic composition according to claim 6, comprising a step of mixing a hydraulic composition or a constituent of a hydraulic composition with the compound of formula (I).

10. A pretreated granulate obtained by mixing a granulate with the compound of formula (I) as defined in claim 1.

11. An additive for inerting clay, comprising a superplasticizer and the compound of formula (I) as defined in claim 1.

12. The method according to claim 1, wherein the hydraulic composition comprises a hydraulic binder, at least one granulate, water, and optionally a superplasticizer.

13. The method according to claim 1, wherein the compound of formula (I) is put in contact with the hydraulic composition at a proportion of from 0.005% to 2% by weight of the hydraulic composition.

14. The method according to claim 1, wherein the hydraulic composition is a concrete or a mortar.

15. The method according to claim 1, wherein the constituent of the hydraulic composition is put in contact with the compound of formula (I).

16. The method according to claim 15, wherein the constituent of the hydraulic composition is water, and the method comprises:
(a) mixing the compound of formula (I) with water, and then
(b) mixing the mixture obtained in step (a) with a hydraulic binder, at least one granulate, and optionally a superplasticizer.

17. The method according to claim 15, wherein the constituent of the hydraulic composition is a hydraulic binder, and the method comprises:
(a) mixing the compound of formula (I) with a hydraulic binder, and then
(b) mixing the mixture obtained in step (a) with at least one granulate, water, and optionally a superplasticizer.

18. The method according to claim 17, wherein the hydraulic binder is cement, and the mixing of the compound of formula (I) with the cement is carried out during grinding of the cement.

19. The method according to claim 15, wherein the constituent of the hydraulic composition is a superplasticizer, and the method comprises the steps:
(a) mixing the compound of formula (I) with a superplasticizer, and then
(b) mixing the mixture obtained in step (a) with a hydraulic binder, at least one granulate, and water.

20. The method according to claim 15, wherein the constituent of the hydraulic composition is granulate, and the method comprises the steps:
(a) mixing the compound of formula (I) with at least one granulate, and then
(b) mixing the mixture obtained in step (a) with a hydraulic binder, water, and optionally a superplasticizer.

21. The clay-inerting method according to claim 5, wherein the alkaline earth metal cation is a magnesium, calcium or barium cation.

* * * * *